United States Patent Office 2,882,324
Patented Apr. 14, 1959

2,882,324

ALKYLATION OF NON-OLEFINIC HYDROCARBONS

Louis Schmerling, Riverside, Ill., assignor to Universal Oil Products Company, Des Plaines, Ill., a corporation of Delaware No Drawing. Application December 24, 1956
Serial No. 630,036

14 Claims. (Cl. 260—666)

This invention relates to the alkylation of hydrocarbons and more particularly to the use of a novel catalyst which is used in the aforesaid alkylation.

It is an object of this invention to disclose a process for the alkylation of alkylatable hydrocarbons using a novel catalyst therefor.

A further object of this invention is to disclose a novel catalyst for the alkylation of alkylatable hydrocarbons with alkylating agents which comprises a mixture of an aluminum halide, a titanium oxide and an alkali metal or alkaline earth metal or aluminum.

One embodiment of the invention resides in a process for the alkylation of a hydrocarbon which comprises alkylating an alkylatable non-olefinic hydrocarbon with an alkylating agent in the presence of an alkylating catalyst consisting of a mixture of an aluminum halide, a titanium oxide and a metal selected from the group consisting of alkali metals, alkaline earth metals, and aluminum, and recovering the resultant alkylated hydrocarbon.

A further embodiment of the invention is found in a process for the alkylation of a hydrocarbon which comprises alkylating an alkylatable non-olefinic hydrocarbon containing a tertiary carbon atom with an alkylating agent in the presence of an alkylation catalyst consisting of a mixture of an aluminum halide, a titanium oxide and a metal selected from the group consisting of alkali metals, alkaline earth metals and aluminum at a temperature in the range of from about 20° to about 250° C., and recovering the resultant alkylated hydrocarbon.

A specific embodiment of the invention is found in a process for the alkylation of a hydrocarbon which comprises alkylating methylcyclopentane with ethylene in the presence of an alkylation catalyst consisting of a mixture of aluminum chloride, titanium dioxide and magnesium at a temperature in the range of from about 20° to about 250° C., and recovering the resultant methylethylcyclopentane.

Other objects and embodiments referring to alternative alkylatable non-olefinic hydrocarbons, alkylating agents and alkali metals or alkaline earth metals will be found in the following further detailed description of this invention.

It has now been discovered that alkylated non-olefinic hydrocarbons may be prepared by condensing an alkylatable non-olefinic hydrocarbon with an alkylating agent in the presence of a novel catalyst, said catalyst consisting of a mixture of an aluminum halide, a titanium oxide and an alkali metal or alkaline earth metal. The novel catalyst composition of this invention has many advantages over the use of pure aluminum chloride as an alkylation catalyst among which are that the novel catalyst will, in general, have a longer life and will often result in a different product distribution. The longer catalyst life will, therefore, allow the process of this invention to be operated in a more economical manner with a resulting lower cost of finished product. The alkylated compounds prepared according to this method may be used as intermediates in the preparation of detergents (for example, by sulfonation) pharmaceuticals, resins, fine chemicals, etc.

Suitable alkylatable non-olefinic hydrocarbons which may be used in the process of this invention include isoparaffins, alkylcycloparaffins and aromatic hydrocarbons, said isoparaffins including isobutane, isopentane, 2-methylpentane, 3-methylpentane, 2,3-dimethylbutane, 2,3-dimethylpentane, 2-methylhexane, 3-methylhexane, 2,3-dimethylhexane, etc.; cycloparaffins which may be used include methylcyclopentane, methylcyclohexane, methylcycloheptane, ethylcyclopentane, propylcyclopentane, ethylcyclohexane, propylcyclohexane, 1,2-dimethylcyclopentane, 1,3-dimethylcyclopentane, 1,2-diethycyclopentane, 1,2-dimethylcyclohexane, 1,2-diethylcyclohexane, etc., decahydronaphthalene, methyldecahydronaphthalene, ethyldecahydronaphthalene, etc. In addition, such hydrocarbons as n-butane, n-pentane and cyclohexane which may, under the operating conditions of the present process, be isomerized to form isobutane, isopentane, and methylcyclopentane respectively may also be used. The aromatic hydrocarbons which may be alkylated are those which are designated as alkylatable aromatic hydrocarbons and contain replaceable hydrogen atoms and include benzene, toluene, o-, m- and p-xylene, 1,2,3-trimethylbenzene, 1,2,4-trimethylbenzene, etc., ethylbenzene, propylbenzene, butylbenzene, etc., 1,2-diethylbenzene, 1,2,3-triethylbenzene, 1,2,4-triethylbenzene, 1,2-dipropylbenzene, 1,3-dipropylbenzene, 1,4-dipropylbenzene, 1,2,3-tripropylbenzene, 1,2,4-tripropylbenzene, etc.; naphthalene, 1-methylnaphthalene, 2-methylnaphthalene, 1-ethylnaphthalene, 2-ethylnaphthalene, 1-propylnaphthalene, 2-propylnaphthalene, etc., 1,2-dimethylnaphthalene, 1,2-diethylnaphthalene, 1,4-dimethylnaphthalene, 1,4-diethylnaphthalene, 1,2-dipropylnaphthalene, 1,4-dipropylnaphthalene, 1,5-dipropylnaphthalene, 1,2,3-trimethylnaphthalene, 1,2,4-trimethylnaphthalene, 1,2,3-triethylnaphthalene, 1,2,4-triethylnaphthalene, 1,2,5-triethylnaphthalene, 1,2,3 - tripropylnaphthalene, 1,2,4 - tripropylnaphthalene, etc.; 1,2,3,4-tetrahydronaphthalene, indene, indan, etc., anthracene, 1-methylanthracene, 2-methylanthracene, 1-ethylanthracene, 2-ethylanthracene, 1,2-dimethylanthracene, 1,2-diethylanthracene, 1,2-dipropylanthracene, etc., phenanthrene, 1-methylphenanthrene, 2-methylphenanthrene, etc., 1-ethylphenanthrene, 2-ethylphenanthrene, etc., 1,2 - dimethylphenanthrene, 1,3 - dimethylphenanthrene, 1,2-diethylphenanthrene, 1,3-diethylphenanthrene, etc., chrysene, 1-methylchrysene, 2-methylchrysene, 1,2-dimethylchrysene, 1,2-diethylchrysene, 1,3-dimethylchrysene, 1,3-diethylchrysene, etc., pyrene, 1-methylpyrene, 2-methylpyrene, 1-ethylpyrene, 2-ethylpyrene, 1,2-dimethylpyrene, 1,2-diethylpyrene, etc. It is understood that the above mentioned alkylatable non-olefinic hydrocarbons such as the isoparaffins, cycloparaffins and aromatic compounds are set forth only as examples of the compounds which may be used in this process and that in addition any non-olefinic hydrocarbon compounds which will undergo alkylation in a condensation reaction with an alkylating agent may be used in the process of the present invention when used in connection with the novel catalyst herein set forth. This will include substituted aromatic compounds other than those enumerated above such as the phenols and halo-substituted benzenes such as chlorobenzene, bromobenzene, dichlorobenzenes, dibromobenzenes, chlorotoluenes, bromotoluenes. etc., and the like.

Suitable alkylating agents which may be used include in particular olefinic hydrocarbons such as ethylene, propylene butene-1, butene-2, pentene-1, pentene-2, hexene-1, hexene-2, hexene-3, 2-methyl-1-pentene, 3-methyl-1-pentene, 2-methyl-2-pentene, 3-methyl-2-pentene, 4-methyl-1-pentene, 4-methyl-2-pentene, 2-methyl-1-hexene, 3-methyl-1-hexene, 4-methyl-1-hexene, etc., 1,3-butadiene, 1,3-pentadiene, 1,4-pentadiene, 1,2-hexadiene, 1,3-hexadiene, 1,4-hexadiene, 2-methyl-1,3-hexadiene etc. It is also contemplated within the scope of this invention that alkyl halides may also be used as alkylating agents although not necessarily with equivalent results, inasmuch as their use will result in a consumption of the metallic portion of the catalyst.

The reaction conditions under which the process of the present invention proceeds are dependent largely upon the reactants used. Generally temperatures ranging from about 20° to about 250° C. or more will be used in the reaction, the preferred range depending largely on the reactivity of the hydrocarbon and the alkylating agent and being readily determined by a few preliminary experiments. The novel catalyst of the present invention comprises a mixture of an aluminum halide, a titanium oxide and an alkali metal or alkaline earth metal or aluminum. Aluminum halides which may be used include aluminum chloride, aluminum bromide, etc. while titanium oxides which may be used include titanium dioxide, titanium peroxide, titanium sesquioxide, etc. The preferred aluminum halide comprises aluminum chloride and the preferred titanium oxide is titanium dioxide. Alkali metals or alkaline earth metals which may be used include lithium, sodium, potassium, rubidium, cesium, iridium, magnesium, calcium, strontium and barium.

The process of this invention may be effected in any suitable manner and may comprise either a batch or a continuous type operation. When a batch type operation is used a quantity of the starting materials, namely, the alkylating agent and the non-olefinic hydrocarbon are gradually added to a mixture of the non-olefinic hydrocarbon and the catalyst in a suitable reaction vessel provided with stirring means. The vessel is then heated to the desired temperature depending upon the reactants and catalysts used in the process. After a predetermined reaction time has elapsed the desired reaction product is separated from the catalyst layer and recovered from the unreacted starting materials by conventional means, for example, by washing, drying, and fractional distillation.

Another method of operation of the present process is of the continuous type. A particularly suitable type of operation comprises a fixed bed type in which the condensation catalyst is disposed as a bed in a reaction zone, said zone being maintained at suitable operating conditions of temperature and pressure. The reaction zone may comprise an unpacked vessel or coil, or may be lined with an adsorbent packing material such as alumina, dehydrated bauxite, fire brick and the like. The non-olefinic hydrocarbon and the alkylating agent are continuously charged to said reactor in separate streams, or if so desired, may be admixed prior to entry into said reactor and charged thereto in a single stream, and passed therethrough in a continuous stream in either an upward or downward flow. Alternatively, a mixture of non-olefinic hydrocarbon and catalyst in one stream, and the alkylating agent, admixed, if so desired, in the non-olefinic hydrocarbon, in another stream are introduced into the reaction zone. The alkylation of the non-olefinic hydrocarbon is continued until the desired time has elapsed, after which the reaction product will be continuously withdrawn from the reaction zone, the liquid product separated from the catalyst and subjected to distillation to yield the desired reaction product, unreacted alkylating agent and non-olefinic hydrocarbon, the latter two being recycled for use as a portion of the starting material while the alkylated hydrocarbons will be withdrawn and purified by conventional means hereinbefore set forth.

Another continuous type of process which may be used in this invention includes the compact moving bed type of operation in which the catalyst and the reactants pass either concurrently or countercurrently to each other.

The following examples are given to illustrate the process of the present invention which, however, are not intended to limit the generally broad scope of the present invention in strict accordance therewith.

Example I 25 g. of a catalyst consisting of 10 g. of magnesium turnings, 10 g. of titanium dioxide and 5 g. of aluminum chloride along with 150 g. of methylcyclohexane were placed in a glass liner of a rotating autoclave having a capacity of 850 cc. The autoclave was first flushed with nitrogen, the liner sealed in, and the autoclave again flushed twice with nitrogen and ethylene pressured in until a pressure of 65 atmospheres was reached. The autoclave was heated, rapid absorption of ethylene occurring when the temperature reached approximately 160° C., the maximum pressure being 90 atmospheres. There was also a very marked adsorption of ethylene when the maximum temperature of about 195° C. was reached. The total reaction time was six hours, at the end of which time the autoclave was allowed to cool to room temperature, the excess ethylene was vented and the reaction product, which showed an increase of 73 g. in weight, consisting of a dark amber liquid and a suspended brown sludge-like solid was recovered. The liquid was filtered off and subjected to fractional distillation. This distillation of the liquid showed that it had a wide boiling range with a plateau occurring at about 147°–150° C., the material having a refractive index, $n_D^{20}$ 1.4330, indicating that the material was methylethylcyclohexane.

Example II 25 g. of a catalyst comprising 10 g. of magnesium turnings, 10 g. of titanium dioxide and 5 g. of aluminum chloride and 100 g. of isopentane were placed in a glass liner of a rotating autoclave having a capacity of 850 cc. The autoclave was treated in a manner similar to that set forth in Example I above. Ethylene was pressured in until a pressure of 65 atmospheres had been reached while the autoclave was heated to a temperature of about 215° C. The autoclave was maintained at this temperature for about 5½ hours. During this time a maximum pressure of 145 atmospheres was reached while the final pressure was about 30 atmospheres. At the end of the reaction time the autoclave and contents thereof were cooled to room temperature, the excess ethylene vented and the reaction product comprising a liquid with only a trace of a sludge-like solid was recovered and subjected to fractional distillation. The distillation resulted in a recovery of about 50 g. of liquid boiling above 28° C., the boiling point of isopentane. About 20% of this product consisted of heptanes shown by infrared analysis to consist largely of 2,3- and 2,4-dimethylpentane and 2-methylhexane.

Example III 25 g. of a catalyst consisting of 10 g. of sodium, 10 g. of titanium dioxide and 5 g. of aluminum chloride along with 150 g. of methylcyclohexane are placed in a glass liner of a rotating autoclave which is first flushed with nitrogen. The liner is sealed in and the autoclave is again flushed with nitrogen. Ethylene is pressured in until a pressure of approximately 65 atmospheres is reached. The autoclave is heated to a temperature of about 200° C. and maintained thereat for approximately 6 hours. At the end of this time the autoclave and contents thereof are allowed to cool to room temperature, the excess ethylene is vented and the reaction product consisting of a liquid is filtered from the solid and is subjected to fractional distillation, the cut boiling at approximately 150° C. consisting of methylethylcyclohexane, being separated and purified.

Example IV 25 g. of a catalyst consisting of 10 g. of aluminum, 10 g. of titanium oxide and 5 g. of aluminum chloride is heated with 150 g. of methylcyclohexane and ethylene in a manner set forth in Example I above. The reaction product resulting therefrom is filtered and subjected to fractional distillation, the cut boiling at about 140°–150° C. consisting chiefly of methylethylcyclohexane, being recovered therefrom.

Example V

A glass liner containing 10 g. each of titanium dioxide and aluminum pigment, 5 g. of aluminum chloride and 52 g. of chlorobenzene was sealed into a rotating autoclave, the air was flushed out with nitrogen, and ethylene was pressed into 40 atmospheres' initial pressure. There was a slow absorption of ethylene at room temperature which became quite rapid when the temperature was raised to 80° C. The final pressure at room temperature was 15° C. The product, which gained 30 g. in weight, consisted of about 24 g. of grey solid and 83 g. of opaque amber liquid which fumed slightly in air, probably due to the presence of ethylaluminum sesquichloride. Distillation of the washed liquid product gave about 12 g. of ethylchlorobenzene, benzene boiling chiefly at about 178°–180° C., about 12 g. of diethylchlorobenzene boiling at about 210°–215° C., as well as more highly ethylated chlorobenzenes.

I claim is my invention:

1. A catalyst comprising a mixture of an aluminum halide, a halogen-free titanium oxide and a metal selected from the group consisting of alkali metals, alkaline earth metals, and aluminum.

2. A process for the alkylation of a non-olefinic hydrocarbon which comprises alkylating an alkylatable non-olefinic hydrocarbon with an alkylating agent in the presence of a mixture of an aluminum halide, a halogen-free titanium oxide and a metal selected from the group consisting of alkali metals, alkaline earth metals, and aluminum, and recovering the resultant alkylated hydrocarbon.

3. A process for the alkylation of a hydrocarbon which comprises alkylating an alkylatable non-olefinic hydrocarbon with an alkylating agent in the presence of a mixture of an aluminum halide, a halogen-free titanium oxide and a metal selected from the group consisting of alkali metals, alkaline earth metals and aluminum at a temperature in the range of from about room temperature to about 250° C., and recovering the resultant alkylated hydrocarbon.

4. A process for the alkylation of a hydrocarbon which comprises alkylating an alkylatable non-olefinic hydrocarbon with an alkylating agent in the presence of a mixture of aluminum chloride, a halogen-free titanium oxide and a metal selected from the group consisting of alkali metals, alkaline earth metals and aluminum at a temperature in the range of from about room temperature to about 250° C., and recovering the resultant alkylated hydrocarbon.

5. A process for the alkylation of a hydrocarbon which comprises alkylating an alkylatable non-olefinic hydrocarbon with an alkylating agent in the presence of a mixture of aluminum chloride, titanium dioxide and a metal selected from the group consisting of alkali metals, alkaline earth metals and aluminum at a temperature in the range of from about room temperature to about 250° C., and recovering the resultant alkylated hydrocarbon.

6. A process for the alkylation of a hydrocarbon which comprises alkylating an alkylatable non-olefinic hydrocarbon with an alkylating agent in the presence of a mixture of aluminum chloride, titanium dioxide and magnesium at a temperature in the range of from about 20° to about 250° C., and recovering the resultant alkylated hydrocarbon.

7. A process for the alkylation of a hydrocarbon which comprises alkylating an alkylatable non-olefinic hydrocarbon with an alkylating agent in the presence of a mixture of aluminum chloride, titanium dioxide and sodium at a temperature in the range of from about 20° to about 250° C., and recovering the resultant alkylated hydrocarbon.

8. A process for the alkylation of a hydrocarbon which comprises alkylating an alkylatable non-olefinic hydrocarbon with an alkylating agent in the presence of a mixture of aluminum chloride, titanium dioxide and aluminum at a temperature in the range of from about 20° to about 250° C., and recovering the resultant alkylated hydrocarbon.

9. A process for the alkylation of a hydrocarbon which comprises alkylating an alkylatable non-olefinic hydrocarbon containing a tertiary carbon atom with an alkylating agent in the presence of a mixture of an aluminum halide, a halogen-free titanium oxide and a metal selected from the group consisting of alkali metals, alkaline earth metals and aluminum at a temperature in the range of from about 20° to about 250° C., and recovering the resultant alkylated hydrocarbon.

10. A process for the alkylation of a hydrocarbon which comprises alkylating isopentane with an alkylating agent in the presence of a mixture of aluminum chloride, titanium dioxide and magnesium at a temperature in the range of from about 20° to about 250° C., and recovering the resultant alkylated isopentane.

11. A process for the alkylation of a hydrocarbon which comprises alkylating methylcyclopentane with an alkylating agent in the presence of a mixture of aluminum chloride, titanium dioxide and magnesium at a temperature in the range of from about 20° to about 250° C., and recovering the resultant alkylated methylcyclopentane.

12. A process for the alkylation of a hydrocarbon which comprises alkylating methylcyclohexane with ethylene in the presence of a mixture of aluminum chloride, titanium dioxide and magnesium at a temperature in the range of from about 20° to about 250° C., and recovering the resultant methylethylcyclohexane.

13. A process for the alkylation of a hydrocarbon which comprises alkylating isopentane with propylene in the presence of a mixture of aluminum chloride, titanium dioxide and magnesium at a temperature in the range of from about 20° to about 250° C., and recovering the resultant octanes and other alkylation products.

14. A process for the alkylation of chlorobenzene which comprises alkylating chlorobenzene with ethylene in the presence of a mixture of aluminum chloride, titanium dioxide and aluminum at a temperature in the range of from about 20° to about 250° C., and recovering the resultant ethylchlorobenzenes.

References Cited in the file of this patent

UNITED STATES PATENTS

| | | |
|---|---|---|
| 2,427,303 | Reid | Sept. 9, 1947 |
| 2,468,831 | Miller | May 3, 1949 |
| 2,542,610 | Young | Feb. 20, 1951 |
| 2,691,054 | Hazlett | Oct. 5, 1954 |
| 2,721,189 | Anderson et al. | Oct. 18, 1955 |
| 2,772,224 | Shalit et al. | Nov. 27, 1956 |